United States Patent [19]

Dillon

[11] Patent Number: 5,995,725
[45] Date of Patent: Nov. 30, 1999

[54] METHOD AND APPARATUS FOR REQUESTING AND RETRIEVING INFORMATION FROM A SOURCE COMPUTER USING TERRESTRIAL AND SATELLITE INTERFACES

[75] Inventor: Douglas M. Dillon, Gaithersburg, Md.

[73] Assignee: Hughes Electronics Corporation, El Segundo, Calif.

[21] Appl. No.: 08/901,152

[22] Filed: Jul. 28, 1997

Related U.S. Application Data

[63] Continuation of application No. 08/257,670, Jun. 8, 1994, abandoned.

[51] Int. Cl.[6] .......................... H04L 29/06; G06F 13/364
[52] U.S. Cl. ........................ 395/200.33; 395/200.69; 370/341; 370/326
[58] Field of Search ........................ 395/700.3, 700.32, 395/700.48, 700.59, 682, 200.61, 200.59, 500.08, 200.32, 200.31, 200.51; 707/573.1; 370/436, 442, 406.34, 318, 341, 496; 380/821.8; 348/12, 17; 455/5.1, 12.1; 42/354; 379/93.09, 106.06; 358/434; 367/68

[56] References Cited

U.S. PATENT DOCUMENTS

| | | | |
|---|---|---|---|
| 4,018,993 | 4/1977 | Edstom ................................ 375/316 |
| 4,135,156 | 1/1979 | Sanders, Jr. et al. .................... 325/4 |
| 4,358,672 | 11/1982 | Hyatt et al. ........................... 235/380 |
| 4,538,073 | 8/1985 | Freige et al. .......................... 307/33 |
| 4,599,647 | 7/1986 | George et al. ........................ 358/122 |
| 4,636,879 | 1/1987 | Narita et al. ......................... 360/72.2 |
| 4,663,743 | 5/1987 | Rampuria et al. ..................... 367/68 |
| 4,680,688 | 7/1987 | Inou et al. ............................ 363/21 |
| 4,686,698 | 8/1987 | Tompkins et al. .................... 348/230 |
| 4,720,873 | 1/1988 | Goodman et al. ...................... 455/2 |
| 4,724,520 | 2/1988 | Athans et al. .................... 395/200.06 |
| 4,736,422 | 4/1988 | Mason ................................... 380/20 |
| 4,768,228 | 8/1988 | Clupper et al. ....................... 380/20 |
| 4,775,974 | 10/1988 | Kobayashi ............................ 370/61 |
| 4,777,657 | 10/1988 | Gillaspie ............................. 455/186 |
| 4,793,813 | 12/1988 | Bitzer et al. ........................ 424/335 |
| 4,802,215 | 1/1989 | Mason .................................. 380/21 |
| 4,828,569 | 5/1989 | Seth-Smith et al. ................. 3890/10 |
| 4,847,892 | 7/1989 | Shelley .............................. 378/93.4 |
| 4,918,653 | 4/1990 | Johri et al. .......................... 364/900 |
| 4,933,936 | 6/1990 | Rasmussen et al. ................. 370/406 |
| 4,940,963 | 7/1990 | Gutman et al. ...................... 340/313 |
| 4,959,872 | 9/1990 | Imai et al. ........................... 455/164 |
| 5,019,910 | 5/1991 | Filmer ................................ 358/188 |
| 5,029,207 | 7/1991 | Gammie ............................... 380/10 |
| 5,038,265 | 8/1991 | Paladel ................................ 363/65 |
| 5,058,138 | 10/1991 | Figura et al. ........................ 375/88 |
| 5,101,267 | 3/1992 | Morales-Garza ..................... 358/84 |
| 5,101,478 | 3/1992 | Fu et al. .............................. 395/821 |
| 5,111,504 | 5/1992 | Esserman et al. .................... 380/21 |
| 5,131,010 | 7/1992 | Derrenge et al. ................... 375/100 |
| 5,157,662 | 10/1992 | Tadamura et al. ................. 370/110.1 |
| 5,193,151 | 3/1993 | Jain ................................ 395/200.06 |
| 5,223,923 | 6/1993 | Morales-Garza ..................... 358/84 |
| 5,237,610 | 8/1993 | Gammie et al. ..................... 380/10 |

(List continued on next page.)

FOREIGN PATENT DOCUMENTS

| | | |
|---|---|---|
| 0 483547A1 | 5/1992 | European Pat. Off. . |
| 62-221228 | 9/1987 | Japan . |

OTHER PUBLICATIONS

Brad Wood, "I Can't Get ISDN. Isn't There Another Way to Get Quick Access to the Web?", PC World, Sep. 1996, pp. 264–265.

*Primary Examiner*—Daniel H. Pan
*Attorney, Agent, or Firm*—John T. Whelan; Michael W. Sales

[57] ABSTRACT

A system in which a personal computer sends messages into a network such as a TCP/IP network using a conventional dial-up link and downloads data from the TCI/IP network using a high-speed one-way satellite link. A preferred embodiment uses a conventional SLIP provider to connect to the TCP/IP network and uses a commercial software TCP/IP package that has a standard driver interface. A spoofing protocol compensates for the long propagation delays inherent to satellite communication.

20 Claims, 8 Drawing Sheets

U.S. PATENT DOCUMENTS

| | | | |
|---|---|---|---|
| 5,245,429 | 9/1993 | Virginio et al. | 358/142 |
| 5,249,164 | 9/1993 | Koz | 358/21 |
| 5,257,369 | 10/1993 | Skeen et al. | 364/21 |
| 5,293,250 | 3/1994 | Okumura et al. | 358/402 |
| 5,301,358 | 4/1994 | Gaskill et al. | 455/56.1 |
| 5,303,042 | 4/1994 | Lewis et al. | 348/14 |
| 5,309,351 | 5/1994 | McFain et al. | 384/132 |
| 5,319,705 | 6/1994 | Halter et al. | 380/4 |
| 5,319,707 | 6/1994 | Wasilewski et al. | 380/14 |
| 5,319,712 | 6/1994 | Finkelstein et al. | 380/44 |
| 5,341,425 | 8/1994 | Wasilewski et al. | 380/20 |
| 5,347,304 | 9/1994 | Moura et al. | 348/12 |
| 5,367,571 | 11/1994 | Bowen et al. | 380/20 |
| 5,394,469 | 2/1995 | Nagel et al. | 380/4 |
| 5,394,561 | 2/1995 | Freeburg | 455/13.1 |
| 5,404,583 | 4/1995 | Lalezari et al. | 455/90 |
| 5,412,660 | 5/1995 | Chen et al. | 310/318 |
| 5,452,357 | 9/1995 | Naccache | 380/25 |
| 5,465,213 | 11/1995 | Ross | 364/486.24 |
| 5,483,466 | 1/1996 | Kawahara et al. | 364/514 |
| 5,483,595 | 1/1996 | Owen | 380/23 |
| 5,491,800 | 2/1996 | Goldsmith et al. | 395/200.51 |
| 5,504,814 | 4/1996 | Miyahara | 380/4 |
| 5,526,404 | 6/1996 | Wiedeman et al. | 379/60 |
| 5,532,914 | 7/1996 | Kageyama et al. | 363/50 |
| 5,548,753 | 8/1996 | Linstead et al. | 395/600 |
| 5,564,076 | 10/1996 | Auvray | 455/76 |
| 5,568,554 | 10/1996 | Eastlake, III | 380/25 |
| 5,590,200 | 12/1996 | Nachman et al. | 380/46 |
| 5,592,173 | 1/1997 | Lau et al. | 342/357 |
| 5,594,776 | 1/1997 | Dent | 379/58 |
| 5,594,782 | 1/1997 | Zicker et al. | 379/63 |
| 5,627,528 | 5/1997 | Kuznicki | 340/825.44 |
| 5,634,190 | 5/1997 | Wiedeman | 455/13.1 |
| 5,652,795 | 7/1997 | Dillion et al. | 380/25 |

| LLC HEADER (1030) | SATELLITE HEADER (1020) | IP DATAGRAM ( PAYLOAD ) (1010) |
|---|---|---|
| DELIVERS PACKET TO SATELLITE GATEWAY STRIPPED OFF IN SATELLITE GATEWAY | USED TO ID CORRECT RECEIVER TERMINAL STRIPPED OFF IN BIC DRIVER IN USER TERMINAL | DESTINED FOR TCP/IP PACKAGE IN USER TERMINAL |

TCP PACKET

METHOD AND APPARATUS FOR REQUESTING AND RETRIEVING INFORMATION FROM A SOURCE COMPUTER USING TERRESTRIAL AND SATELLITE INTERFACES

This application is a Continuation of application No. 08/257,670 filed on Jun. 8, 1994, now abandoned.

BACKGROUND OF THE INVENTION

This application relates to a computer network and, more specifically, to a method and apparatus for allowing both high-speed and regular-speed access to a computer network.

The Internet is an example of a TCP/IP network. The Internet has over 10 million users. Conventionally, access to the Internet is achieved using a slow, inexpensive method, such as a terrestrial dial-up modem using a protocol such as SLIP (Serial Line IP), PPP, or by using a fast, more expensive method, such as a switched 56 Kbps, frame relay, ISDN (Integrated Services Digital Network), or T1.

Users generally want to receive (download) large amounts of data from networks such as the Internet. Thus, it is desirable to have a one-way link that is used only for downloading information from the network. A typical user will receive much more data from the network than he sends. Thus, it is desirable that the one-way link be able to carry large amounts of data very quickly. What is needed is a high bandwidth one-way link that is used only for downloading information, while using a slower one-way link to send data into the network.

Currently, not all users have access to high speed links to networks. Because it will take a long time to connect all users to networks such as the Internet via physical high-speed lines, such as fiber optics lines, it is desirable to implement some type of high-speed line that uses the existing infrastructure.

Certain types of fast network links have long propagation delays. For example, a link may be transmitting information at 10 Mbps, but it may take hundreds of milliseconds for a given piece of information to travel between a source and a destination on the network. In addition, for even fast low-density links, a slow speed return-link may increase the round trip propagation time, and thus limit throughput. The TCP/IP protocol, as commonly implemented, is not designed to operate over fast links with long propagation delays. Thus, it is desirable to take the propagation delay into account when sending information over such a link.

SUMMARY OF THE INVENTION

The present invention overcomes the problems and disadvantages of the prior art by allowing a user to download data using a fast one-way satellite link, while using a conventional low-speed Internet connection for data being sent into the network. The invention uses a "spoofing" technique to solve the problem of the long propagation delays inherent in satellite communication.

In accordance with the purpose of the invention, as embodied and broadly described herein, the invention is a network system that forms a part of a network, comprising: a source computer, having a link to the network; a destination computer, having a link to the network; a satellite interface between the source computer and the destination computer, wherein information passes from the source computer to the destination computer; means in the destination computer for requesting information from the source computer over the network; means for receiving an information packet sent from the source computer in response to the request and for sending the information packet to the destination computer over the satellite interface; and means for sending an ACK message to the source computer in response to receipt of the information packet, wherein the ACK message appears to the source computer to have come from the destination computer.

In further accordance with the purpose of the invention, as embodied and broadly described herein, the invention is a gateway in a network system that forms a part of a TCP/IP network, wherein the network includes a source computer having a link to the TCP/IP network and a link to a satellite interface, and a destination computer having a link to the TCP/IP network and a link to the satellite interface, the gateway comprising: means for receiving an information packet sent from the source computer and for sending the information packet to the destination computer over the satellite interface; and means for sending an ACK message to the source computer in response to receipt of the information packet, wherein the ACK message appears to the source computer to have come from the destination computer.

Objects and advantages of the invention will be set forth in part in the description which follows and in part will be obvious from the description or may be learned by practice of the invention. The objects and advantages of the invention will be realized and attained by means of the elements and combinations particularly pointed out in the appended claims.

DESCRIPTION OF THE DRAWINGS

The accompanying drawings, which are incorporated in and constitute a part of this specification, illustrate several embodiments of the invention and, together with the description, serve to explain the principles of the invention.

DETAILED DESCRIPTION OF THE PREFERRED EMBODIMENTS

Reference will now be made in detail to the preferred embodiments of the invention, examples of which are illustrated in the accompanying drawings. Wherever possible, the same reference numbers will be used throughout the drawings to refer to the same or like parts.

a. General Overview

A preferred embodiment of the present invention uses satellite technology to implement a high-speed one way link between a user's computer and a TCP/IP network, such as the Internet or a private TCP/IP network. This high-speed link is used to download data from the network. The user's computer also has a conventional TCP/IP link for sending data to the network. The invention can use various forms of high-speed, one-way links, such as satellites and cable television lines. The invention can use various forms of low-speed networks, such as TCP/IP networks, dialup telephones, ISDN D-channel, CPDP, and low-speed satellite paths.

The described embodiment of the present invention uses satellites to provide a high-speed one-way link. Satellites can cover large geographical areas and are insensitive to the distance between a transmitter and a receiver. In addition, satellites are very efficient at point-to-point and broadcast applications, and are resilient and resistant to man-made disasters. Two-way satellites are expensive to use, however, because of the costs involved in purchasing and installing satellite earth station hardware. In the past, these costs have placed satellite communications outside the reach of the consumer.

The present invention allows a personal computer to receive downloaded information from the network via a satellite at a very practical cost. In the present invention, the cost of satellite communications is reduced because a one-way satellite link is used. Receive-only earth station equipment is cheaper to manufacture because it requires less electronics than send/receive antennae.

As is well-known in the art, communication over the Internet and similar TCP/IP networks is achieved through a group (suite) of protocols called Transmission Control Protocol/Internet Protocol (TCP/IP). The TCP/IP protocol is described in the book "Internetworking With TCP/IP, Vol I" by Douglas Comer, published by Prentice-Hall, Inc., of Englewood Cliffs, N.J., 1991, which is incorporated by reference.

b. Hybrid TCP/IP Access

Figure 1:
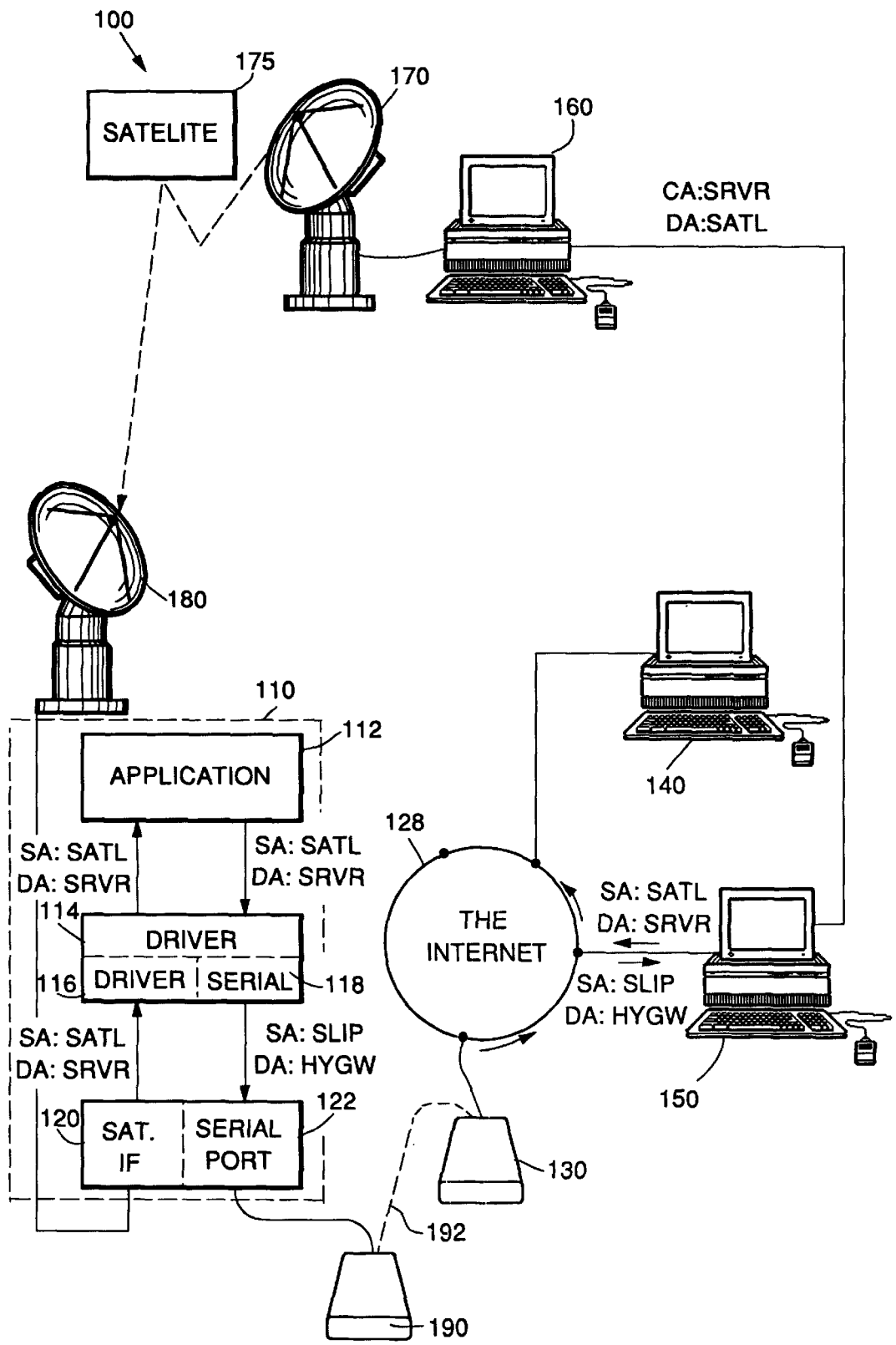
FIG. 1 is a hardware block diagram of a preferred embodiment of the invention.

FIG. 1 is a hardware block diagram of a preferred embodiment of the invention. FIG. 1 includes five subsystems: a hybrid terminal 110, a SLIP provider (Internet connection) 130, an application server 140, a hybrid gateway 150, and a satellite gateway 160. Hybrid terminal 110 is connected to a modem 190, e.g., a 9600 baud modem, which connects to SLIP provider 130 through a telephone line 192. A satellite transmitter 170, a satellite 175, and a satellite receiver 180 provide a fast, one-way link for transferring data from satellite gateway 160 to hybrid terminal 110. Satellite transmitter 170, satellite 175 and satellite receiver 180, however, do not themselves necessarily comprise a part of the present invention. Each of SLIP provider 130, application server 140, and hybrid gateway 150 are connected to the Internet 128. As is well-known in the art, the Internet 128 is a "network of networks" and can be visually depicted only in general terms, as seen in FIG. 1.

Each of hybrid terminal 110, SLIP provider 130, application server 140, hybrid gateway 150 and satellite gateway 160 preferably includes a processor (not shown) that executes instructions stored in a memory (also not shown). Other parts of the invention may also include processors that are not discussed herein, such as I/O processors, etc.

Preferably, hybrid terminal 110, hybrid gateway 150, and satellite gateway 160 are implemented as personal computers including an 80386/80486 or Pentium based personal computer operating at at least 33 MHz, but these elements can be implemented using any data processing system capable of performing the functions described herein. Alternatively, the functionality of both hybrid gateway 150 and satellite gateway 160 could be performed by a single gateway unit (not shown) without departing from the spirit or scope of the present invention. In the described embodiment, SLIP provider 130 is a conventional SLIP provider and application server 140 is any application server that can connect to the Internet 128 via TCP/IP.

As shown in FIG. 1, hybrid terminal 110 preferably also includes application software 112, driver software 114, a serial port 122 for connecting hybrid terminal 110 to modem 190, and satellite interface hardware 120 for connecting hybrid terminal 110 to satellite receiver 180.

Figure 2:
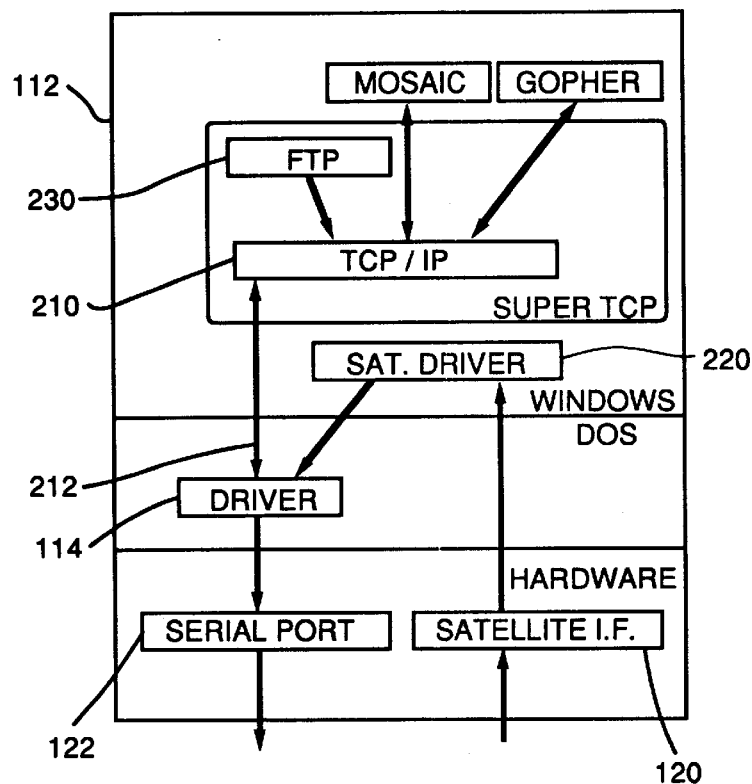
FIG. 2 is a diagram of a portion of a hybrid terminal of FIG. 1.

FIG. 2 shows a relationship between software in application 112, software in driver 114, serial port 122, and satellite interface 120. Application software 112 preferably includes TCP/IP software, such as SuperTCP, manufactured by Frontier, Inc., Chameleon, manufactured by Netmanager, and IRNSS, manufactured by Spry, Inc. The described embodiment preferably operates with the SuperTCP TCP/IP package and, thus, uses a standard interface 212 between the TCP/IP software 210 and driver 114. Examples of standard interface 212 between TCP/IP software 210 and driver 114 include the Crynson-Clark Packet Driver Specification and the 3Com/Microsoft Network Driver Interface Specification (NDIS). Other embodiments within the scope of the invention may use other standard or non-standard interfaces between TCP/IP software 210 and driver 114.

As shown in FIG. 2, application software 112 also includes well-known Internet utilities, such as FTP 230, and well-known user interfaces, such as Mosaic and Gopher (shown). Application software 112 can also include other utilities, e.g., News and Archie (not shown).

The following paragraphs describe how a request from hybrid terminal 110 is carried through the Internet 128 to application server 140 and how a response of application server 140 is carried back to the user at hybrid terminal 110 via the satellite link. (As used herein, the term "satellite link" refers to any portion of the path between application server 140, the Internet 128, satellite gateway 160, satellite transmitter 170, satellite 175, satellite receiver 180 and hybrid terminal 110.) The operation of each subsystem will be described below in detail in separate sections.

In the present invention, hybrid terminal 110 is given two IP addresses. One IP packet address corresponds to SLIP provider 130 and is assigned by a SLIP service provider. The other IP address corresponds to satellite interface 120 and is assigned by a hybrid service provider. IP addresses are assigned by the SLIP and satellite network managers and loaded into hybrid terminal 110 as part of an installation configuration of the hybrid terminal's hardware and software. These two IP addresses correspond to completely different physical networks. SLIP provider 130 does not "know" anything about the satellite interface IP address or even whether the user is using the satellite service. If a host somewhere in the Internet is trying to deliver a packet to the satellite interface IP address by using the Internet routing scheme of routers, gateways, and ARPs (Address Resolution protocol), the only way that the packet can reach the satellite interface IP is to traverse the satellite by being routed through satellite gateway 160.

The following example assumes that a user at hybrid terminal 110 desires to send a request to a remote machine, such as application server 140, that is running FTP (File Transfer protocol) server software. The FTP software running on application server 140 receives file transfer requests and responds to them in an appropriate fashion.

Figure 3:
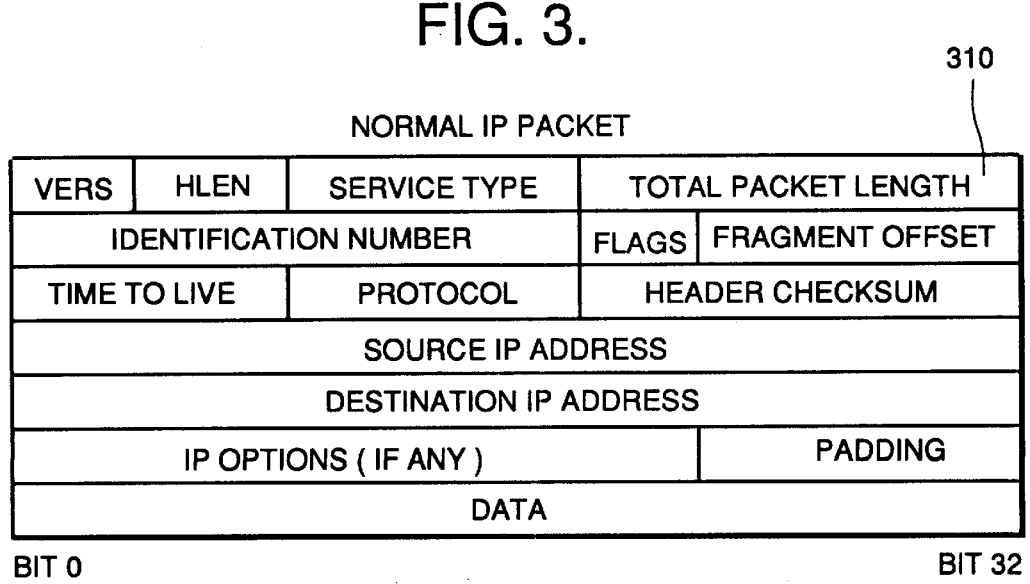
FIG. 3 is a diagram showing an IP packet format.

FIG. 3 shows the contents of a source field (SA) and of a destination field (DA) of packets sent between the elements of FIG. 1. A request for a file and a response of a file sent from application server 140 to hybrid terminal 110 may take the following path.

Figure 4:
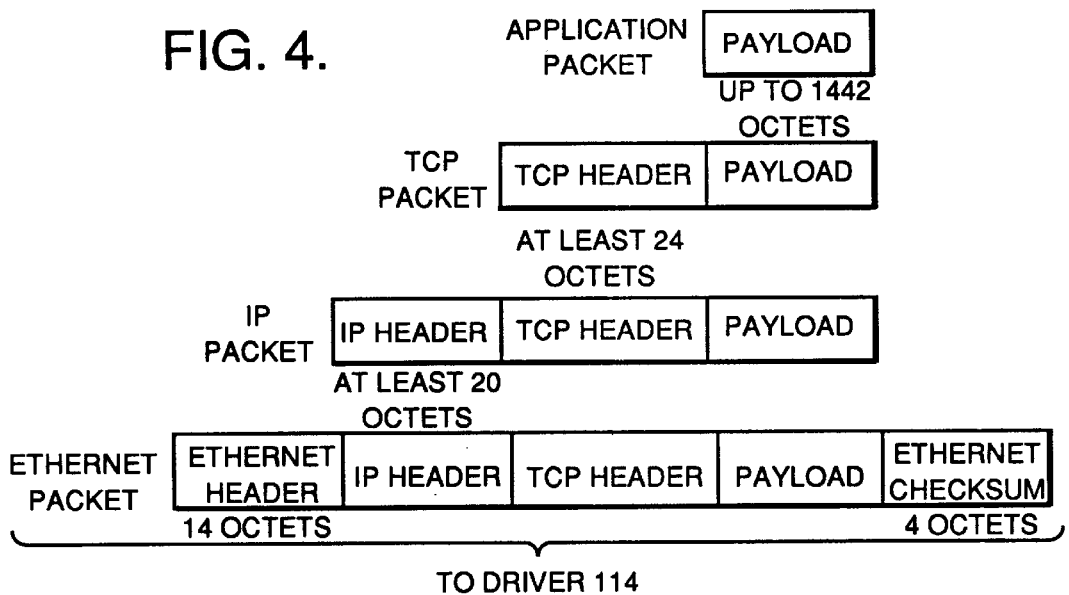
FIG. 4 is a diagram showing a plurality of packet formats, including an Ethernet packet format.

1) Within hybrid terminal 110, FTP client software 230 generates a request and passes it to TCP/IP software 210. TCP/IP software 210 places the request in a TCP packet (see FIG. 11). Next, the TCP packet is placed in an IP packet, having a format shown in FIG. 3. TCP/IP software 210 places the IP packet in an Ethernet packet, as shown in FIG. 4, and passes the Ethernet packet to driver 114. This packet has a source IP address corresponding to satellite interface 120 and a destination IP address of application server 140.

Ethernet is a packet switching protocol standardized by Xerox Corporation, Intel Corporation, and Digital Equipment Corporation, which is described in "The Ethernet" A Local Area Network Data Link Layer and Physical Layer Specification," September 1980, which is available from any of these three companies, and which is incorporated by reference.

Figure 5:
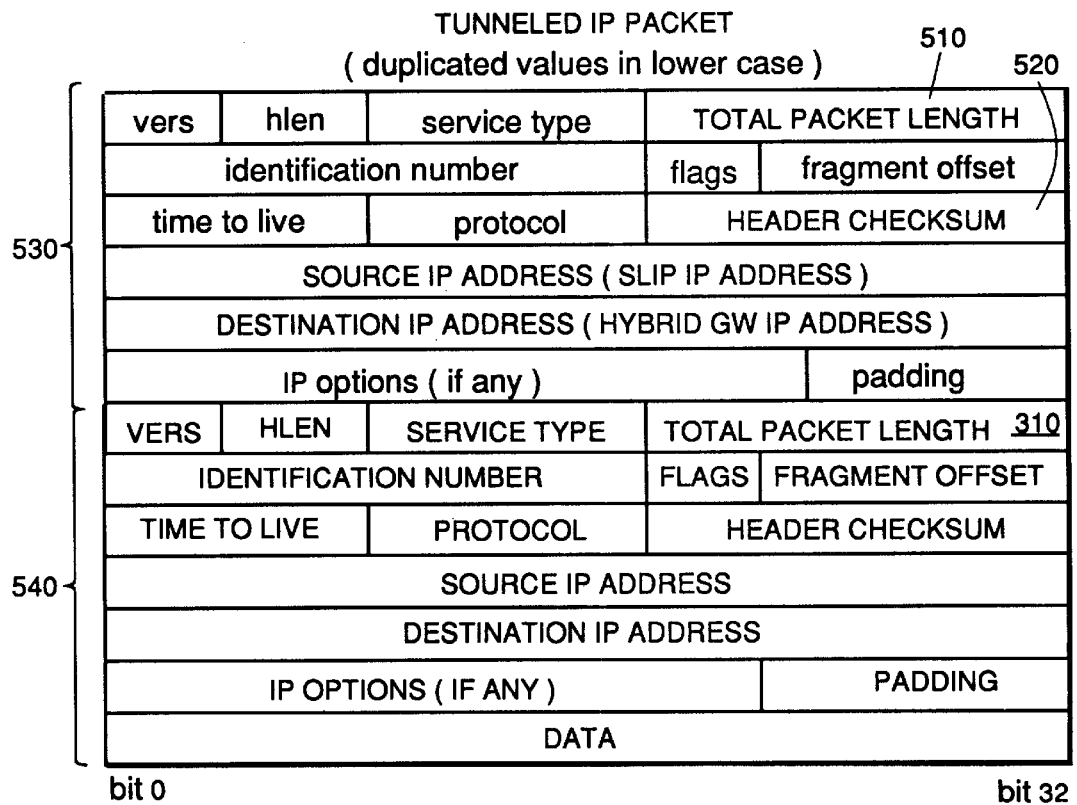
FIG. 5 is a diagram showing a tunnelling packet format.
Figure 7:
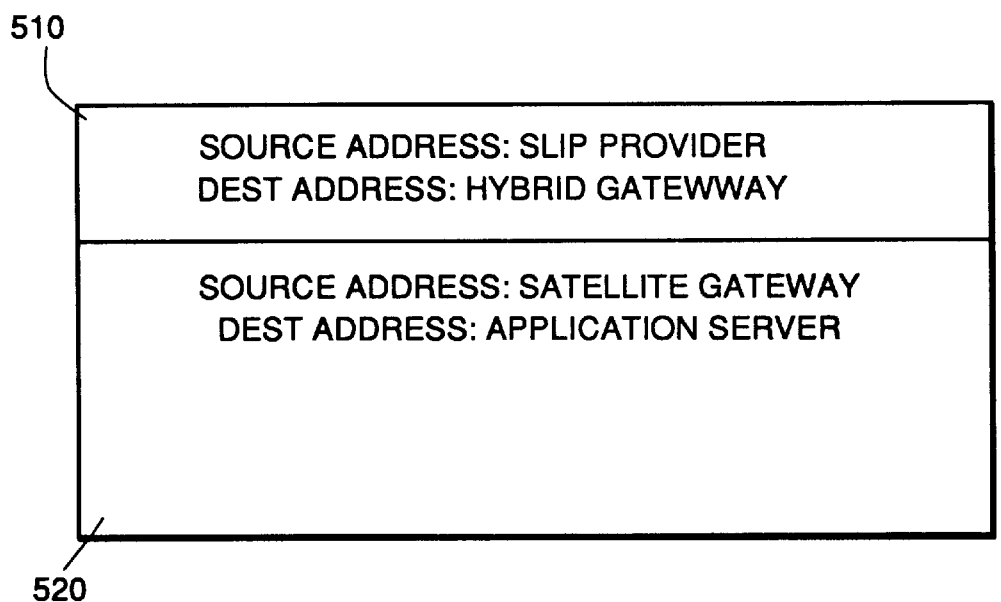
FIG. 7 is a diagram showing an example of partial data in a, tunnelling packet.

2) In driver 114, the Ethernet header and checksum are stripped off the packet and the IP packet is encapsulated, or "tunneled," inside of another IP packet and sent over serial port 122 to SLIP provider 130. FIG. 5 shows a format of a tunnelled packet. FIG. 7 shows an example of a tunnelled packet. The encapsulation adds a new IP header 530 in front of the original packet 540 with a source address corresponding to SLIP provider 130 and a destination address corresponding to hybrid gateway 150.

3) SLIP provider 130 receives the IP packet, analyzes the tunneling header and, thinking it is destined for hybrid gateway 150, uses standard Internet routing to send the packet to hybrid gateway 150.

4) When hybrid gateway 150 receives the packet, it strips off the tunneling header, revealing the true header with application server 140 as the destination. The packet is then sent back out into the Internet 128.

5) Internet routing takes the packet to application server 140, which replies with the requested file and addresses the reply to the request's source IP address, i.e., the IP address of the hybrid terminal's satellite interface 120.

6) In order to find the hybrid terminal's satellite interface 120, the Internet routing protocol will send the packet to the subnet containing a router/gateway connected to hybrid gateway 150. When a router on the same physical network as satellite gateway 160 and hybrid gateway 150 sends out an ARP for the IP address of satellite interface 120 (to find a physical address of satellite interface 120), hybrid gateway 150 responds and says "send it to me." Thus, application server 140 and the rest of the Internet 128 think that packets sent to hybrid gateway 150 will reach the hybrid terminal's satellite interface.

7) Once hybrid gateway 150 receives a reply packet from application server 140, it sends it to satellite gateway 160. In the described embodiment, hybrid gateway 150 encapsulates the packet in a special packet format that is used over the satellite link and uses the satellite interface IP address to uniquely identify the satellite packet's destination. Then hybrid gateway 150 sends the packet over the Ethernet to satellite gateway 160.

8) Satellite gateway 160 broadcasts over the satellite link any packets it receives from hybrid gateway 150.

9) Driver 114 in hybrid terminal 110 that services satellite interface 120 scans all packets broadcast over satellite transmitter 170 looking for its satellite interface IP address in the header. Once it identifies one, it captures it, strips off the satellite header revealing the reply IP packet, and sends it to driver 114.

Thus, IP packets sent into Internet 128 are carried by the SLIP connection, while IP packets from the Internet 128 are carried by the satellite link. The following paragraphs describe the operation of each subsystem in more detail.

1. The Hybrid Terminal

Hybrid terminal 110 is the terminal with which the user interacts. Thus, hybrid terminal 110 preferably includes a user interface device (not shown) such as a mouse, keyboard, etc. As shown in FIG. 1, hybrid terminal 110 includes one or more application programs 112 (including TCP/IP software 210), and driver software 114, which communicates with SLIP provider 130 through a serial port 122 and modem 190, using a serial driver portion 118, and which communicates with satellite receiver 180 through a satellite interface 120, using a driver portion 116.

To TCP/IP software 210, driver 114 appears to be an Ethernet card, although driver 114 is actually connected to satellite receiver 180 (via satellite interface 120) and to SLIP provider 130 (via serial line 122 and modem 190, respectively ). Thus, TCP/IP software 210 believes that it is communicating with a single physical network, when it is, in reality, communicating with two physical networks (the SLIP dialup network and a satellite network).

Figure 6:
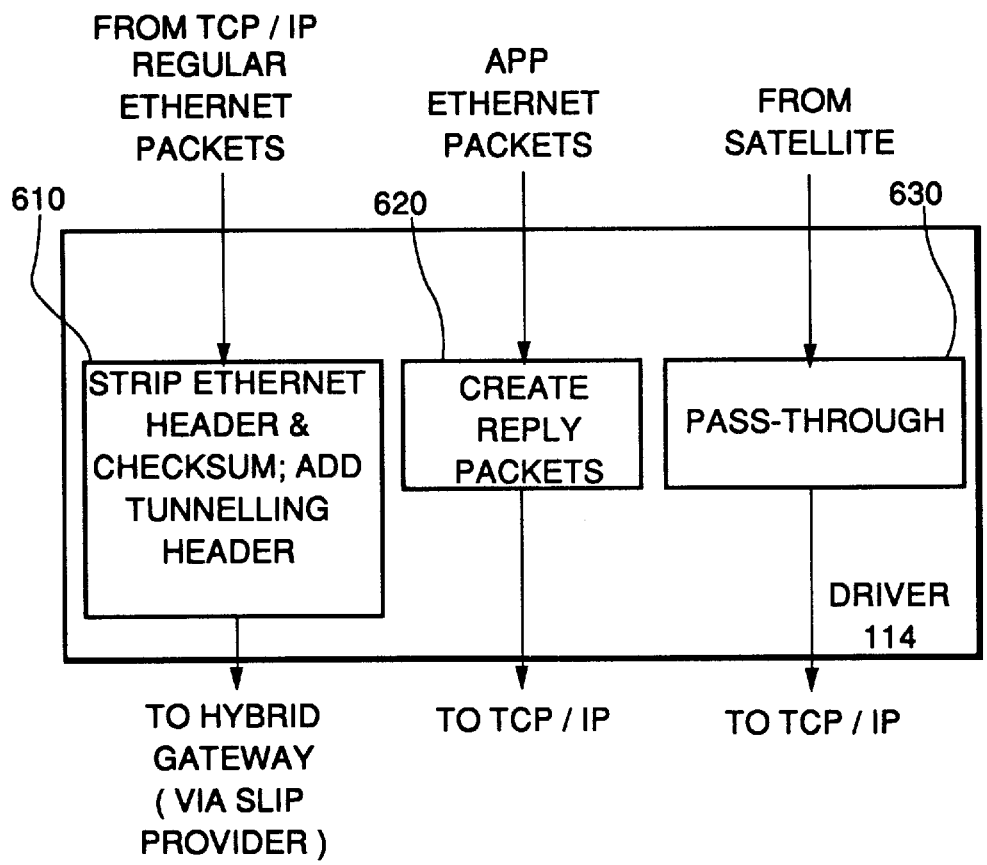
FIG. 6 is a diagram of steps performed by the hybrid terminal of FIG. 1.

FIG. 6 is a diagram of steps performed by driver 114 of hybrid terminal 110 of FIG. 1. As shown in FIG. 6, driver 114 receives packets of data from TCP/IP software 210 and passes them to SLIP provider 130 via serial port 122 and modem 190. A packet sent by application server 140 is received through satellite receiver 180, passed through the satellite interface 120, passed to the satellite driver 220, and passed to driver 114, which passes the received packet to TCP/IP software 210.

The following paragraphs discuss two basic functions performed by driver 114 (tunnelling and ARP handling) and discuss various implementation details for the preferred embodiment.

A. "Tunnelling"

As discussed above, hybrid terminal 110 has two IP addresses associated with it: one for SLIP provider 130 and one for the satellite interface 120. Packets containing requests are sent from hybrid terminal 110 to application server 140 via the Internet 128, while packets containing a reply are sent back via the satellite link. Tunnelling is the method by which application server 140 is "fooled" into sending a reply to a different IP address (satellite interface 120) than that of the sender (serial port 122).

A packet received by driver 114 from the TCP/IP software 210 has a source address of satellite gateway 160 and a destination address of application server 140. As shown in step 610 of FIG. 6, driver 114 removes the Ethernet header and checksum and encapsulates the IP header into an IP tunnelling header having a source address of SLIP provider 130 and a destination address of hybrid gateway 150 (see FIG. 7). As described above, at hybrid gateway 150, the tunnelling header is removed and the packet is sent back into the Internet 128 to be sent to application server 140.

When forming a tunnelling header, driver 114 copies all the values from the old header into the new one with the following exceptions. The source and destination addresses of the tunnelling header change, as described above. In addition, a total packet length field 510 is changed to contain the content of length field 310 plus the length of the tunnelling header. Lastly, the driver 114 recalculates checksum 520 of the tunnelling header because some of the fields have changed.

B. ARP Handling

ARP (Address Resolution Protocol) is used by TCP/IP to dynamically bind a physical address, such as an Ethernet address, to an IP address. When TCP/IP finds an IP address for which it does not know a physical address, TCP/IP broadcasts an ARP packet to all nodes, expecting a response that tells TCP/IP what physical address corresponds to the IP address.

During initialization, driver 114 declares to TCP/IP software 210 that driver 114 is an Ethernet card to ensure that the packets that TCP/IP package sends are Ethernet packets and that the TCP/IP package will be prepared to receive packets at a high-rate of speed. As shown in step 620 of FIG. 6, when driver 114 detects that TCP/IP has sent an ARP packet, driver 114 creates a physical address and sends a reply packet to TCP/IP software 210. The contents of the physical address are irrelevant, because driver 114 strips off the Ethernet header on packets from TCP/IP before the packets are sent to SLIP provider 130.

C. Other Functions

As shown in step 630 of FIG. 6, packets received by driver 114 from satellite receiver 180 (via satellite driver 114) are passed to TCP/IP software 210. The following paragraphs discuss implementation details for the described embodiment.

In a preferred embodiment, TCP/IP software 210 (e.g., Frontier's SuperTCP) sends an ACK (acknowledge) for every packet it receives, even though this action is not required by the TCP/IP protocol. In this situation, many packets compete for the slow link to SLIP provider 130. In TCP/IP, the ACK scheme is cumulative. This means that when a transmitter receives an ACK stating that the receiver has received a packet with sequence number N, then the receiver has received all packets with sequence numbers up to N as well, and there is no reason why every packet needs to be ACK'ed.

Figure 8:
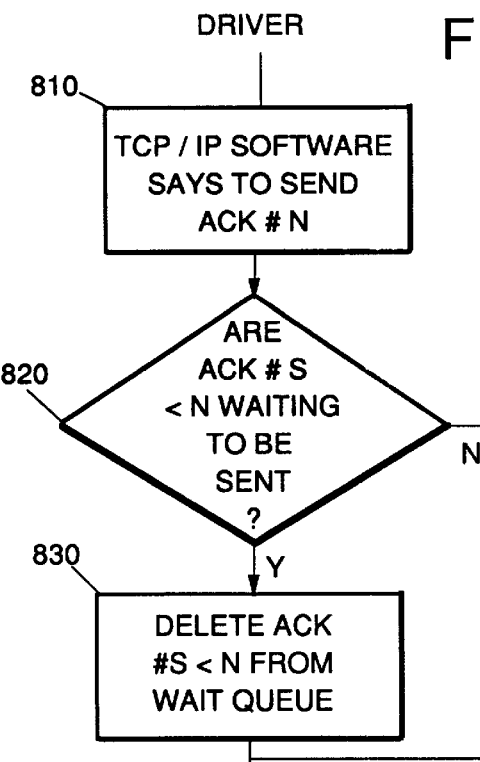
FIG. 8 is a flowchart of steps performed by the hybrid terminal of FIG. 1.
Figures 10, 11:
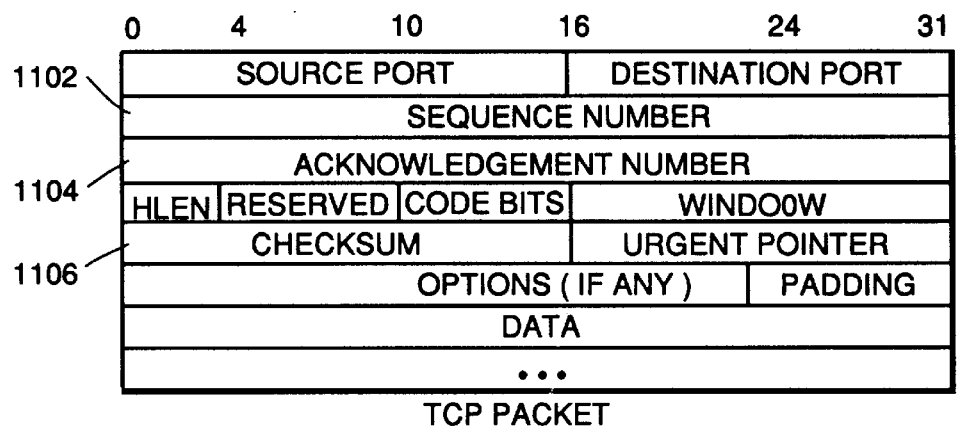
FIG. 10 is a diagram showing a format of packets sent to a satellite gateway of FIG. 1.
FIG. 11 is a diagram showing a TCP packet format.

FIG. 8 is a flowchart of steps performed in a preferred embodiment by driver 114 of hybrid terminal 110. FIG. 11 is a diagram showing a preferred TCP packet format. FIG. 11 includes a sequence number field 1102, an acknowledgment (ACK) number field 1104, and a checksum field 1106. In step 810 of FIG. 8, driver 114 receives an ACK packet with sequence number N from TCP/IP software 210. The packet is queued along with other packets waiting to be sent to SLIP provider 130. In step 820 driver 114 checks to determine whether there is a "run" of sequential packets waiting to be sent. If so, in step 830, driver 114 deletes ACK packets for the same TCP connection that have sequence numbers in the run from the queue and sends an ACK only for the highest sequence number in the run. This action alleviates the bottleneck caused by the relatively slow modem speeds.

Serial port 122 provides a physical connection to modem 190 and, through it, to the terrestrial network via a SLIP protocol as described below in connection with SLIP provider 130. Serial data is sent and received through an RS-232 port connector by a UART (Universal Asynchronous Receiver Transmitter), such as a U8250, which has a one byte buffer and is manufactured by National Semiconductor, or a U16550, which has a 16 byte buffer and is also manufactured by National Semiconductor.

The invention preferably operates under the DOS operating system and Windows, but also can operate under other operating systems.

Satellite driver software 220 receives packets from satellite 180, and passes them to driver 114 using a DOS call. Thus, the two physical links are combined within driver 114 and the existence of two physical links is transparent to TCP/IP software 210. Satellite driver 220 scans all packets transmitted over the satellite channel for a packet with a header corresponding to the IP address of the satellite interface 122, performs some error detection and correction on the packet, buffers the received packet, and passes the packet to driver 114 using a DOS call, e.g., IOCTL-output-cmd( ). Driver 114 copies data from satellite driver 220 as quickly as possible and passes it to TCP/IP software 210.

As discussed above, TCP/IP software 210 is fooled into thinking that it is connected to an Ethernet network that can send and receive at 10 Mbps. This concept is helpful on the receive side because data from the satellite is being received at a high rate. On the transmit side, however, modem 190 is not capable of sending at such a high rate. In addition, TCP/IP software 210 sends Ethernet packets to driver 114, i.e., an IP packet is encapsulated into an Ethernet packet. Because SLIP provider 130 expects IP packets, driver 114 must strip the Ethernet header before the packet is sent to SLIP provider 130.

As described above in connection with FIG. 8, driver 114 also includes a transmit and receive queue. As data is received from TCP/IP software 210 and received from the satellite driver 220, it is buffered within the queue. When the queue is full, e.g., when TCP/IP is sending packets faster than modem 190 can send them, driver 114 drops the packets and returns an error so that TCP/IP software 210 will decrease its rate of transmission.

In a first preferred embodiment, a SLIP connection is initiated with an automatic logon procedure. In another preferred embodiment, driver 114 executes instructions to allow a user to perform a SLIP logon manually.

Because TCP/IP software 210 preferably is configured to talk to the Ethernet and it is desirable to receive the largest packet size possible, driver 114 configures TCP/IP so that the MTU (Maximum Transmission Unit) of the network is as large as possible, e.g., 1500 bytes. Some SLIP providers 130 have a smaller MTU, e.g., 512 bytes. To handle the disparity in size, driver 114 segments large packets received from TCP/IP software 210 into segments the size of the SLIP MTU. Once a packet is segmented, it is reassembled in hybrid gateway 150. Only the tunnelling header is copied as the header of the segments.

2. The SLIP Provider

SLIP provider 130 performs the function of connecting hybrid terminal 110 to the Internet 128. As described above, other protocols, such as PPP, could also be used to perform the connecting function. SLIP server 130 receives SLIP encoded IP packets from modem 190, uncodes them, and forwards them to hybrid gateway 150 via the Internet 128.

In its most basic form, SLIP provider 130 delimits IP packets by inserting a control character such as hex 0×C0 between them. To insure that a data byte is not mistaken for the control character, all outgoing data is scanned for instances of the control character, which is replaced by a two character string. The SLIP protocol is described in detail in J. Romkey, "A Nonstandard for Transmission of IP Datagrams over Serial Lines: SLIP," RFC 1055, June 1988, pp. 1–6, which is incorporated by reference.

3. The Application Server

Application server 140 is a computer system running any combination of known application programs available on the Internet 128 using the TCP/IP protocol suite. For example, application server 140 may transfer files to requesting users via FTP. In this regard, application server 140 may be thought of as a host computer. Although hybrid terminal 110 actually has two IP addresses (a serial port address and an address for the satellite interface), the software executing on application server 140 thinks that it is receiving requests over the satellite network and sending responses over the satellite network. Hybrid terminal 110 is completely transparent to application server 140.

4. The Hybrid Gateway

Although only one hybrid terminal 110 is shown in FIG. 1, the invention can include a plurality of hybrid terminals 110. Preferably, all packets sent from all hybrid terminals 110 pass through hybrid gateway 150 to get untunnelled. Thus, hybrid gateway 150 is a potential system bottleneck. Because of this potential bottleneck, the functions of hybrid gateway 150 are as simple as possible and are performed as quickly as possible. Hybrid gateway 150 also has good Internet connectivity to minimize the accumulated delay caused by packets waiting to be processed by hybrid gateway 150.

A. Untunnelling

Figure 9:
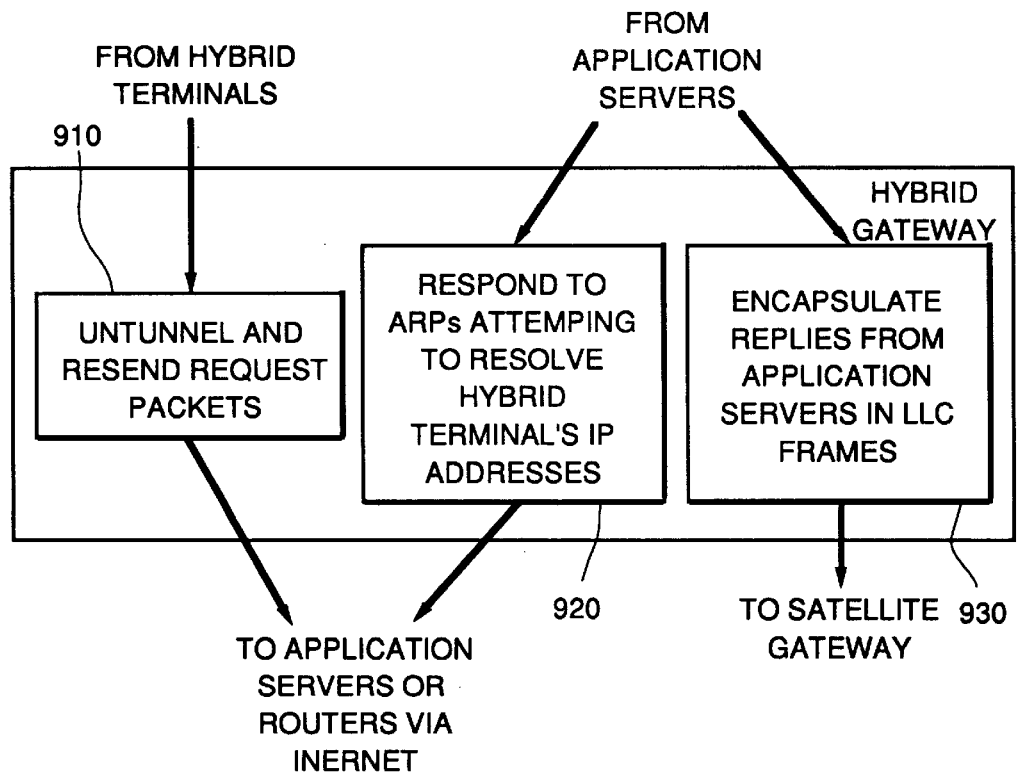
FIG. 9 is a diagram of steps performed by a hybrid gateway of FIG. 1.

FIG. 9 is a diagram of steps performed by hybrid gateway 150 of FIG. 1. In step 910, hybrid gateway 150 receives a tunnelled packet having a format shown in FIG. 5. Hybrid gateway 150 "untunnels" the packet by stripping off the tunnelling header and passes the packet back to the Internet 128.

As described above, packets are sometimes broken into segments when they are sent in order to accommodate a small MTU of SLIP provider 130. Packets may also be segmented as they pass through other elements of the Internet 128 having small MTUs. For fragmented packets, only the tunnelled header is copied into the header of each segment. Hybrid gateway 150 stores fragmented packets in a memory (not shown) and reassembles them in order before untunnelling the original packet and passing it to the Internet 128. Preferably, a "time to live" value is assigned to each packet when it is sent by driver 114 and if all segments do not arrive before a time to live timer expires, the packet is discarded.

B. ARP Responding

Preferably, satellite gateway 160 is on a same physical network as hybrid gateway 150. As shown in step 920 of FIG. 9, when a router on the same physical network as satellite gateway 160 and hybrid gateway 150 sends out an ARP for the IP address of satellite gateway 160 (to find a physical address of satellite gateway 160), hybrid gateway 150 responds and says "send it to me." Hybrid gateway 150 needs to intercept packets intended for satellite gateway 160 because it needs to encapsulate packets for satellite gateway 160 as follows.

C. Satellite Packetizing

The following paragraphs describe how packets travel from application server 140 through hybrid gateway 150 and to satellite gateway 160. The following explanation is given by way of example and is not intended to limit the scope of the present invention. As shown in step 930 of FIG. 9, hybrid gateway 150 encapsulates replies from application server 140 into a satellite packet format. FIG. 10 is a diagram showing a format of a satellite packet sent to satellite gateway 160 of FIG. 1. A satellite packet includes the data 1010 of an original IP packet and two headers 1020, 1030 added by hybrid gateway 150.

Satellite gateway 160 expects IP packets to be encapsulated first in a special satellite packet and then within an LLC-1 IEEE 802.2 link level control, type 1 packet. Satellite header 1020 identifies the downlink and contains a sequence number and the packet length. An LLC-1 header 1030 preferably is used to send the packet to satellite gateway 160, in an Ethernet LAN. Hybrid gateway 150 prepares packets for satellite gateway 160 by appending headers 1020 and 1030 to the front of an IP packet 1010.

The receiver in hybrid terminal 110 does not receive the LLC-1 header 1030. Hybrid terminal 110 identifies packets intended for it by checking a least significant byte in the satellite IP address. Thus, a six byte satellite destination address is determined by reversing an order of bytes of the satellite IP address for hybrid terminal 110 and then padding the rest of the address with zeroes.

5. The Satellite Gateway

Satellite gateway 160 can include any combination of hardware and software that connects satellite transmitter 170 to hybrid gateway 150. Satellite transmitter 170 and satellite receiver 180 can be any combination of hardware and software that allows data to be transmitted by satellite transmitter 170 and received by satellite receiver 180, and to be input to hybrid terminal 110. For example, satellite gateway 160 preferably is a personal computer with a high-speed Ethernet connection to hybrid terminal 110. When satellite gateway 160 receives a packet from hybrid gateway 150, it sends it over the satellite link.

Satellite communication may be effected by, for example, the Personal Earth Station designed and manufactured by Hughes Network Systems Inc. In a preferred embodiment, a one-way version of the Personal Earth Station is used. Another embodiment uses a satellite communication system manufactured by Comstream. Yet another embodiment uses a system that allows hybrid terminal 110 to be connected directly to satellite receiver 180 via Hughes Network Systems' DirecPC-product. The DirecPC satellite interface card is described in "DirecPC, Phase A Data Sheet," dated Jun. 7, 1993, which is attached as Appendix A, which is incorporated in and constitutes a part of this specification, and which is incorporated by reference.

At the downlink, satellite receiver 180 includes a 0.6 meter receive-only antenna receiving HDLC encapsulated LAN packets. Satellite interface 120 includes rate 2/3 Viterbi/Reed-Soloman concatenated forward error correction.

Although only one hybrid terminal 110 and one application server 140 are shown in FIG. 1, the invention can include a plurality of hybrid terminals 110 and/or a plurality of application servers 140. Preferably, all packets sent from all application servers 140 to a hybrid interface 110 pass through satellite gateway 160. Thus, satellite gateway 160 is a potential system bottleneck. Because of this potential bottleneck, the functions of satellite gateway 160 are as simple as possible and are performed as quickly as possible.

c. Protocol Spoofing

TCP/IP protocol specifies that only a predetermined number of packets can be outstanding during transmission, i.e., that only a limited number of packets can be sent before an ACK (acknowledgment) is received. The high bandwidth and long delays incurred in sending packets to an orbiting satellite and back means that at any given time, a large number of packets may be "in the pipe" between transmitter and receiver.

When using conventional TCP/IP protocol, application server 140 sends a predetermined number of packets in accordance with a predetermined window size, and then waits to receive ACKs over the modem link before sending additional packets. The purpose of windowing is to limit a number of packets that must be re-sent if no ACK is received and to provide flow control, e.g., to prevent sending packets faster than they can be received. The packets that have not been ACK'ed are stored in a memory so that they can be re-sent if no ACK is received.

In a preferred embodiment of the present invention, hybrid gateway 150 "spoofs" application server 140 to improve the throughput over the satellite link. Specifically, hybrid gateway 150 sends an ACK to application server 140, even though a corresponding packet may not have been received by hybrid terminal 110 via the satellite at the time.

Figure 12:
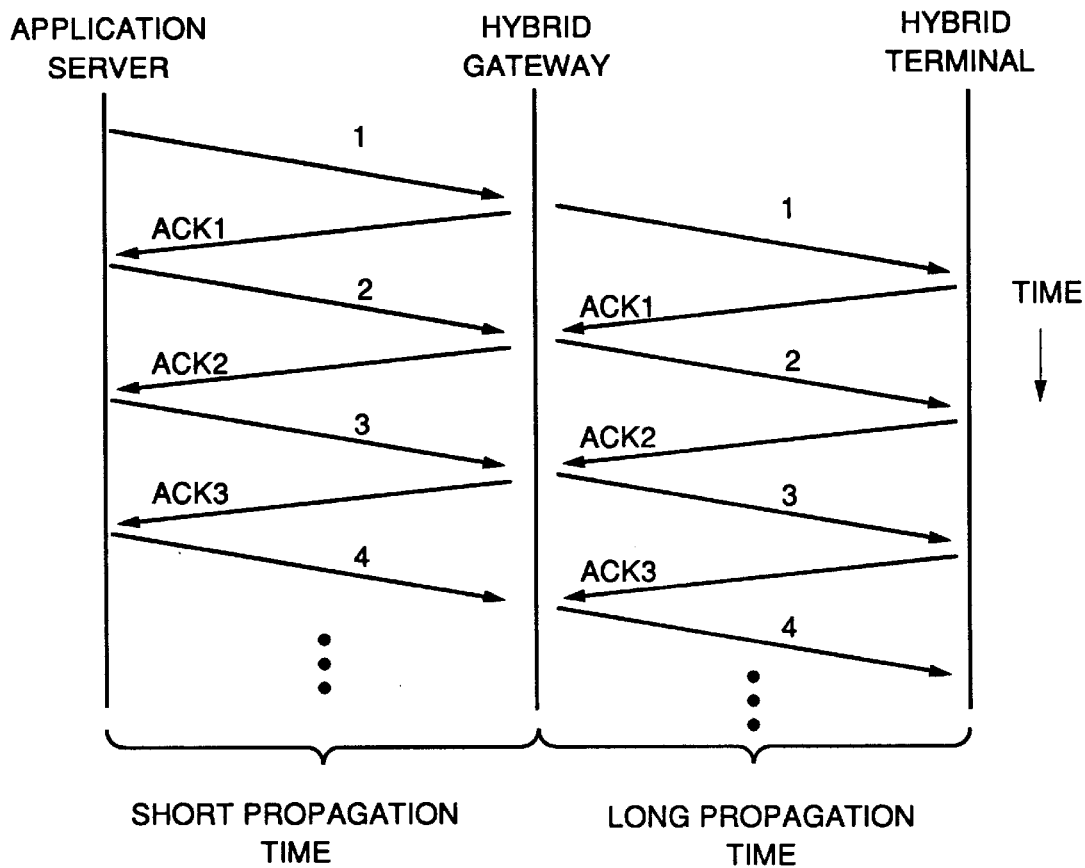
FIG. 12 is a ladder diagram showing packets sent from an application server to the hybrid gateway and from the hybrid gateway to the hybrid terminal over a satellite link.
Figures 13A, 13B:
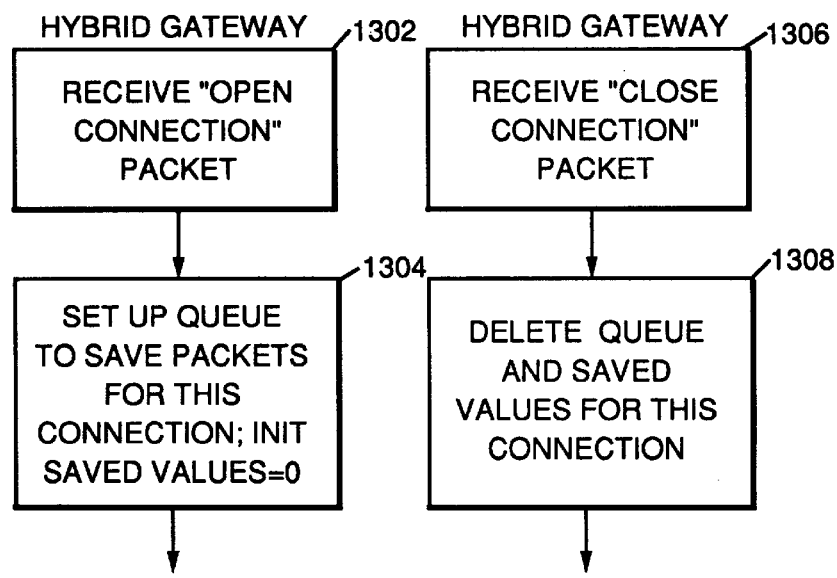
FIGS. 13(a) through 13(e) are flowcharts of steps performed by the hybrid gateway of FIG. 1.
Figure 13C:
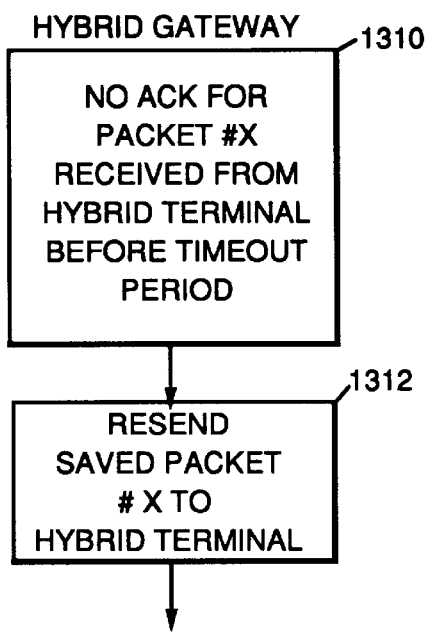
Figure 13D:
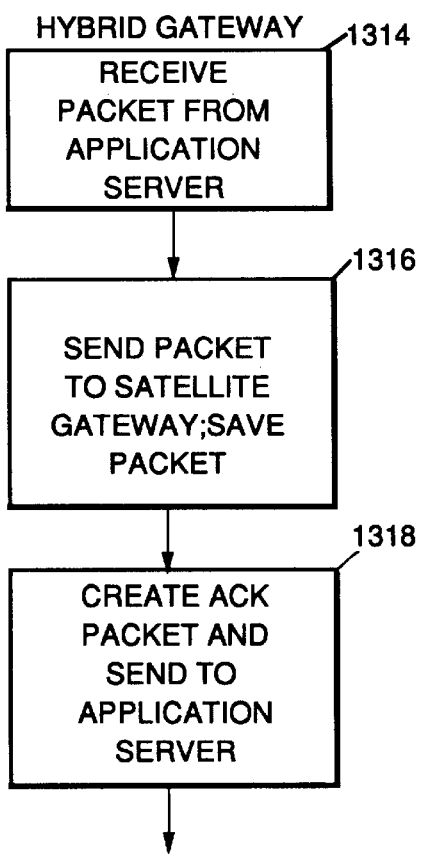
Figure 13E:
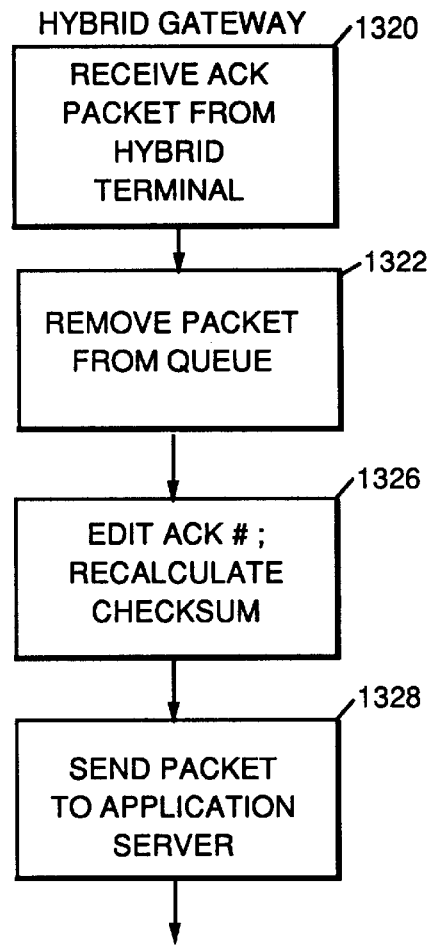

FIG. 12 is a ladder diagram showing packets sent from application server 140 to hybrid gateway 150 and from hybrid gateway to hybrid terminal 110 through the satellite link. FIG. 12 is not drawn to scale. In FIG. 12, application server 140 sends a message #1 to hybrid gateway 150. The propagation time for this transmission is relatively short. Hybrid gateway 150 immediately creates an ACK packet and sends it to application server 140. Hybrid gateway 150 also sends packet #1 to hybrid terminal 110 through the satellite link. This transmission has a long propagation delay. When hybrid terminal 110 receives the packet, it sends an ACK #1 back to hybrid gateway 150 (e.g., using the tunnelling mechanism described above). In a system that does not use tunnelling, hybrid gateway 150 needs to intercept the ACK packets from hybrid terminal 110.

FIGS. 13(*a*) through 13(*e*) are flowcharts of steps performed by hybrid gateway 150 of FIG. 1 during protocol spoofing. In step 1302 of FIG. 13(*a*), hybrid gateway 150 receives a packet from application server 140 indicating that a new connection is being formed between application server 140 and hybrid terminal 110. In step 1304, hybrid gateway 150 sets up a queue or similar data structure in memory to save un-ACK'ed packets for the new connection. FIG. 13(*b*) show corresponding steps performed by hybrid gateway 150 when the connection is closed. Hybrid gateway 150 receives a packet indicating the closure in step 1306 and deletes the queue and saved values for the connection in step 1308.

In step 1310 of FIG. 13(*c*), hybrid gateway 150 fails to receive an ACK for a packet number X from hybrid terminal 110 before an end of a predetermined timeout period. Hybrid gateway 150 maintains a timer for each un-ACK'ed packet. At the end of the predetermined period, hybrid gateway 150 retransmits a packet corresponding to the expired timer. In step 1312, hybrid gateway 150 re-sends packet number X, which it previously saved in the memory queue for this connection (see FIG. 13(*d*) below), In step 1314 of FIG. 13(*d*), hybrid gateway 150 receives a packet from application server 140. In step 1316, hybrid gateway 150 sends the received packet to satellite gateway 160, where it is transmitted over the satellite link, and saves the packet in case it needs to be retransmitted (see FIG. 13(*c*)). Hybrid gateway 150 then creates an ACK packet to send to application server 140 in step 1318. The created ACK packet incorporates a format shown in FIG. 11. Hybrid gateway 150 creates an ACK number for field 1104. The ACK number is determined as follows:

Hybrid gateway 150 saves the following information for each connection:

1) Send sequence number—a highest in-sequence sequence number of packets sent by application server 140 over the connection.

2) ACK sequence number—the ACK sequence number from the most recent packet sent by hybrid terminal 110 over this connection.

3) ACK window size—the window size from the most recent packet from hybrid terminal 110 over this connection.

4) ACK number—the ACK sequence number that is relayed to application server 140. The ACK number is set to:

minimum(send sequence number, ACK sequence number+spoofed window size−ACK window size).

5) spoofed window size—predetermined maximum number window size to be allowed on this connection.

When hybrid gateway 150 inserts the ACK number in the packet, it also calculates the packet's checksum 1106.

In step 1320 of FIG. 13(*e*), hybrid gateway 150 receives an ACK packet over the modem link from hybrid terminal 110. In step 1322, hybrid gateway 150 removes from the queue the packet for which the ACK was received. Because an ACK was received, the packet does not need to be re-sent. In the TCP/IP protocol, a packet containing an ACK may or may not contain data. Hybrid gateway 150 edits the received packet to replace the packet's ACK number 1104 with a "spoofed" ACK number in step 1326. The spoofed ACK number is determined in the same way as the ACK number in step 1318 of FIG. 13(*d*). When hybrid gateway 150 substitutes the spoofed ACK number 1104 in the packet, it also recalculates the packet's checksum 1106 in step 1326.

In step 1328, hybrid gateway 150 forwards the received ACK packet to application server 140. Application server 140 may simply disregard the packet if it contains an ACK and no data. In another embodiment, hybrid gateway 150 simply discards a packet received from hybrid terminal 110 that contains an ACK, but no data.

If the connection goes down, either explicitly or after a predetermined period of time, hybrid gateway 150 deletes the saved packets for the connection.

d. Summary

In summary, the present invention allows a personal computer to send messages into the Internet using a conventional dial-up link and to download data from the Internet using a high-speed one-way satellite link. In a preferred embodiment, the invention uses a conventional SLIP provider to connect to the Internet and uses a commercial software TCP/IP package that has a standard driver interface. A spoofing protocol compensates for the long propagation delays inherent to satellite communication.

Other embodiments will be apparent to those skilled in the art from consideration of the specification and practice of the invention disclosed herein. It is intended that the specification and examples be considered as exemplary only, with a true scope of the invention being indicated by the following claims.

What is claimed is:

1. A system, comprising:

a first apparatus coupled to the internet and to a satellite link, said first apparatus comprising (a) unencapsulating means for receiving from the internet a first IP packet having a second IP packet encapsulated therein and for forwarding the second IP packet to its destination IP address on the internet and (b) means for receiving a reply from the apparatus associated with the destination IP address and for forwarding the reply to the source IP address of the second IP packet via the satellite link; and a second apparatus including (a) a port for connecting said second apparatus to the internet via a modem and an internet service provider, wherein said second apparatus has an IP address which is associated with connection to the internet via said port, (b) a satellite interface for coupling said second apparatus to the satellite link, wherein said second apparatus has another IP address, which is associated with said satellite interface, (c) means for generating a request from said second apparatus to a destination apparatus on the internet, the request comprising an IP packet wherein the source IP address is the IP address associated with said satellite interface and the destination IP address is the IP address of the destination apparatus on the internet, and (d) a driver for encapsulating the IP packet of the request in an encapsulating IP packet wherein the source IP address is the IP address associated with connection to the internet via said port and the destination address is the IP address of said first apparatus and for transmitting the encapsulating IP packet to said first apparatus by way of said port and said internet service provider, whereby the request from said second apparatus to the destination apparatus on the internet is transmitted to the destination apparatus via said first apparatus and is replied to from the destination apparatus to said second apparatus via said first apparatus and said satellite interface.

2. A system according to claim 1, wherein said second apparatus communicates with the internet service provider via said port and the modem using SLIP or PPP.

3. A system according to claim 1, wherein said driver receives the request in the form of an Ethernet packet.

4. A system according to claim 3, wherein said driver comprises means for extracting the IP packet of the request from the Ethernet packet.

5. A system according to claim 1, wherein said driver comprises means for identifying itself as an Ethernet device.

6. A system according to claim 1, wherein said driver processes packets from said satellite interface using a TCP/IP maximum transmission unit that is larger than that used by said driver to send packets to the internet service provider via said port.

7. A system according to claim 1, wherein said port is a serial port.

8. A system according to claim 1, wherein the request comprises a request selected from the group consisting of an FTP request, an internet browser request, and an internet news request.

9. A system according to claim 1, wherein when the destination apparatus on the internet replies to the IP address associated with said satellite interface via said first apparatus and the satellite link, said first apparatus responds to an address resolution protocol request for the IP address of said satellite interface and forwards reply packets from the destination apparatus to said satellite interface of said second apparatus via the satellite link.

10. A system according to claim 1, wherein said satellite interface is coupled to a satellite receiver.

11. A system according to claim 1, wherein the IP address associated with connection to the internet via said port is assigned by the internet service provider.

12. A system according to claim 1, wherein said second apparatus further comprises scanning means for scanning packets received from said satellite interface to identify packets addressed to the IP address associated with said satellite interface.

13. A system according to claim 12, wherein said scanning means passes the identified packets to said driver.

14. A system according to claim 1, wherein said driver encapsulates the IP packet of the request into the data area of the encapsulating IP packet.

15. A system according to claim 14, wherein the IP addresses of said first apparatus and the destination apparatus are different IP addresses.

16. A system according to claim 1, wherein the IP addresses of said first apparatus and the destination apparatus are different IP addresses.

17. A method for use with a system comprising (1) a first apparatus coupled to the internet and to a satellite link, the first apparatus comprising (a) unencapsulating means for receiving from the internet a first IP packet having a second IP packet encapsulated therein and for forwarding the second IP packet to its destination IP address on the internet and (b) means for receiving a reply from the apparatus associated with the destination IP address and for forwarding the reply to the source IP address of the second IP packet via the satellite link, and (2) a second apparatus including (a) a port for connecting the second apparatus to the internet via a modem and an internet service provider, wherein the second apparatus has an IP address which is associated with connection to the internet via the port and (b) a satellite interface for coupling the second apparatus to the satellite link, wherein the second apparatus has another IP address, which is associated with the satellite interface, said method comprising:

generating a request from the second apparatus to be transmitted to a destination apparatus on the internet, the request comprising an IP packet wherein the source IP address is the IP address associated with the satellite interface and the destination IP address is the IP address of the destination apparatus on the internet;

encapsulating the IP packet of the request in an encapsulating IP packet wherein the source IP address is the IP address associated with connection to the internet via the port and the destination address is the IP address of the first apparatus;

transmitting the encapsulating IP packet from the second apparatus to the first apparatus by way of the port and the internet service provider;

unencapsulating the encapsulating IP packet at the first apparatus and forwarding the IP packet of the request to the IP address of the destination apparatus on the internet; and receiving, at the first apparatus, a reply from the destination apparatus on the internet, and forwarding the reply to the second apparatus via the satellite link, whereby the request from the second apparatus to the destination apparatus on the internet is transmitted to the destination apparatus via the first apparatus and is replied to from the destination apparatus to the second apparatus via the first apparatus and the satellite interface.

18. A method according to claim 17, wherein the second apparatus communicates with the internet service provider via the port and the modem using SLIP or PPP.

19. A method according to claim 17, further comprising the step of extracting the IP packet of the request from an Ethernet packet.

20. A method according to claim 17, wherein the request comprises a request selected from the group consisting of an FTP request, an internet browser request, and an internet news request.

* * * * *

UNITED STATES PATENT AND TRADEMARK OFFICE
CERTIFICATE OF CORRECTION

PATENT NO. : 5,995,725

DATED : November 30, 1999

INVENTOR(S) : Douglas M. DILLON

Page 1 of 8

It is certified that error appears in the above-identified patent and that said Letters Patent is hereby corrected as shown below:

ON THE COVER PAGE:

AT [56] References Cited - U.S. Patent Documents:

| | | | |
|---|---|---|---|
| --5,335,276 | 8/1994 | Thompson et al. | 340/21 |
| 5,337,044 | 8/1994 | Folger et al. | 340/825.44 |
| 5,359,367 | 10/1994 | Stockill | 348/552 |
| 5,387,994 | 2/1995 | McCormack et al. | 359/159 |
| 5,400,401 | 3/1995 | Wasilewski et al. | 380/9 |
| 5,404,505 | 4/1995 | Levinson | 395/600 |
| 5,420,866 | 5/1995 | Wasilewski | 370/110.1 |
| 5,481,609 | 1/1996 | Cohen et al. | 380/16 |
| 5,506,904 | 4/1996 | Sheldrick et al. | 380/23-- | should be inserted.

UNITED STATES PATENT AND TRADEMARK OFFICE
CERTIFICATE OF CORRECTION

PATENT NO. : 5,995,725

DATED : November 30, 1999

INVENTOR(S) : Douglas M. DILLON

It is certified that error appears in the above-identified patent and that said Letters Patent is hereby corrected as shown below:

COLUMN 12:

After line 59, before the claims, please insert the Appendix as follows:

--APPENDIX

DirecPc is a satellite, one-way broadcast network offering three services to the IBM compatible PC:

1. Digital package delivery – Software, games, multi-media news, electronic documents and any other data in the form of a collection of PC files are made available to the PC on a scheduled or on-demand basis.
2. Data Pipe – provides multiple independent digital streams to carry video, audio, etc.
3. Hybrid Internet Access – high-speed, low-cost Internet connection where DirecPc carries packets from the Internet and dial-up modem carries packets into the Internet.

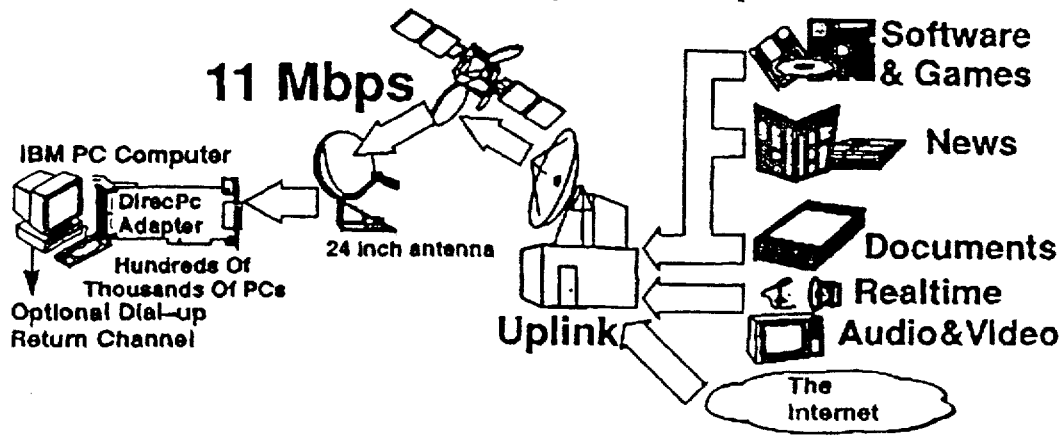

UNITED STATES PATENT AND TRADEMARK OFFICE
CERTIFICATE OF CORRECTION

PATENT NO. : 5,995,725

DATED : November 30, 1999

INVENTOR(S) : Douglas M. DILLON

It is certified that error appears in the above-identified patent and that said Letters Patent is hereby corrected as shown below:

To receive the DirecPc broadcast, a PC is equipped with a PC plug-in card and a 24 inch antenna. DirecPc uses a full Galaxy class Ku-Band transponder to provide an 11 Mbps broadcast channel. DES encryption based conditional access ensures that a receiver PC may only access data it is authorized to receive.

Section 1  PC User Perspective

The PC hardware consists of the DirecPc adapter, an antenna and a TVRO standard coaxial cable. The DirecPc adapter is a 16-bit ISA adapter providing throughput comparable to a 16-bit ISA ethernet adapter.

The software appears to the user as a set of Windows applications. The applications:

- assist installation and service registration.
- support package delivery by allowing the user to select packages for reception, be notified when packages are received. The software also supports billing for packages received.
- provide a TCP/IP protocol stack and set of applications for Hybrid Internet access.
- provide a driver DLL on which third party software may layer data pipe applications.

The software for a data pipe service is provided by the enterprise providing the service.

Communications back to the uplink is required for billing purposes and also for Hybrid Internet access. This communications takes place via the PC's dial-up AT command-set modem.

Section 2  Open Interfaces And APIs

The DirecPc architecture is open, allowing content providers complete control over their content and the user interface to their content. DirecPc provides interfaces to content providers at the uplink and Application Programming Interfaces (APIs) on the receiving PC. The specifications and APIs are available on request.

UNITED STATES PATENT AND TRADEMARK OFFICE
CERTIFICATE OF CORRECTION

PATENT NO. : 5,995,725

DATED : November 30, 1999

INVENTOR(S) : Douglas M. DILLON

It is certified that error appears in the above-identified patent and that said Letters Patent is hereby corrected as shown below:

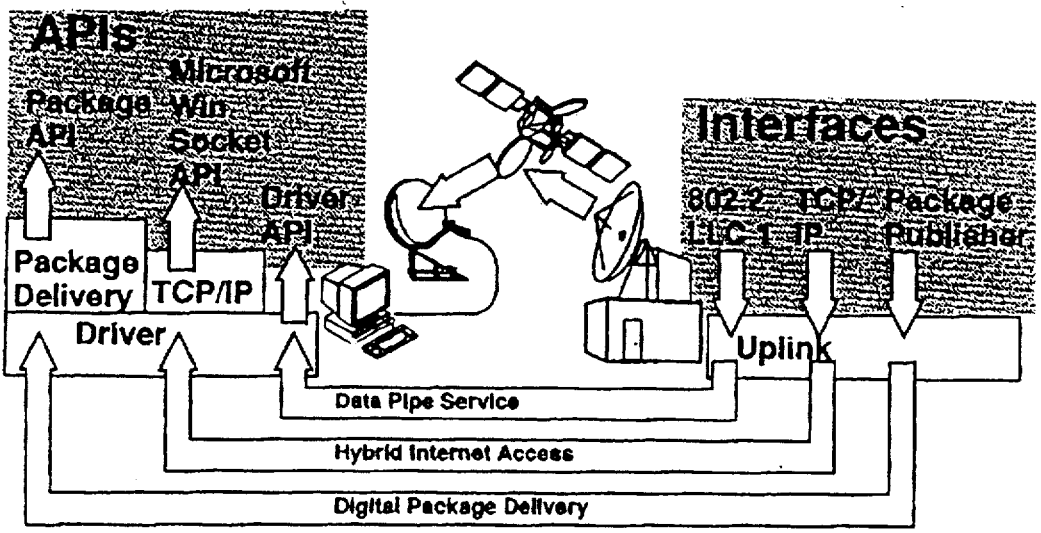

Section 3 Content Providers

A content provider is an organization that supplies the data sent over the DirecPc system. A content provider can be categorized as being either a:

1. Package Publisher – uses the DirecPc system as a means of selling and distributing software packages or data packages where a package consists of a set of PC files.
2. Data Pipe Provider – uses the DirecPc system as a data pipe transport mechanism. User services (News Feeds, Internet Access, Broadcast Video and Audio, etc.) are layered on top of a datagram transport.

DirecPc supports multiple content providers of both kinds.

UNITED STATES PATENT AND TRADEMARK OFFICE
CERTIFICATE OF CORRECTION

PATENT NO. : 5,995,725

DATED : November 30, 1999

INVENTOR(S) : Douglas M. DILLON

It is certified that error appears in the above-identified patent and that said Letters Patent is hereby corrected as shown below:

Section 4 DirecPc Package Distribution

The DirecPc system allows data packages to distributed and purchased. The term "package" refers to any data (including electronic documents, multi-media data, software packages, games, etc.) which can take the form of a group of PC files.

To prepare a package for transmission, a publisher merges the package's files into a single file using the appropriate utility (e.g. PKZIP or ARJ) and loads the package into the uplink using an off-the-shelf file transfer mechanism (e.g. TCP/IP's FTP, floppy-disk, CD-ROM, X-Modem, etc.). Scheduling, pricing and conditional access restrictions can be performed either manually or automatically under publisher control when the package is loaded into the uplink.

DirecPc's conditional access mechanism ensures that a user may only receive authorized packages. As part of initial registration, the user is provided a credit limit. The PC locally maintains a credit account. When the user selects a package for reception, the PC records the transaction and debits the account. A log of all package receptions is maintained on the PC's hard disk and can be browsed by the graphical front-end.

On uplink operator command, when the local credit limit is exceeded or when the user has purchased a certain number of packages, the PC makes a dial-up call to the DirecPc billing service. The call reports the billing information as well as usage information of packages received.

The usage information is used to provide feedback for future scheduling of packages. The reports given to publishers include, for each package reception, the name, address etc. of the recipient, the ID of the package and when package delivery took place.

A software package may either be transmitted on a scheduled basis or on-demand. Scheduled transfers are perfect for:

1. Periodical Distribution -- examples include news and weather updates, electronic newspaper, magazine and catalog distribution.
2. Popular Package Delivery – packages for which there are expected to be multiple recipients. The most popular (or highest profit) packages would be scheduled more frequently to reduce the average time spent waiting, while less popular packages may be scheduled for overnight delivery. Scheduled delivery is lower cost than delivering a package on-request to each buyer. The schedule for individual packages is manually set by hub operators with the submission of the package.

UNITED STATES PATENT AND TRADEMARK OFFICE
CERTIFICATE OF CORRECTION

PATENT NO. : 5,995,725

DATED : November 30, 1999

INVENTOR(S) : Douglas M. DILLON

It is certified that error appears in the above-identified patent and that said Letters Patent is hereby corrected as shown below:

Phase A package delivery allows a single transmission at any given time. The rate of transmission is settable under operator control at speeds up to 2 Mbits/sec. Support for simultaneous transmissions will be provided in a subsequent release of DirecPc software.

A software package may be transmitted on-demand in the gaps between scheduled transmissions. Such a transfer delivers the information more quickly to the requesting PC, but at greater cost as the package is not broadcast. A PC uses its modem to request the package.

DirecPc's low bit error rate and high availability ensure that packages are reliably delivered with one transmission. For even greater reliability, each package may be set to employ one or more of the following methods to ensure fail-safe delivery:

1. Repeated Transmission - A package may be scheduled to be sent more than once to ensure its delivery. A receiving PC, if any packets are lost on the first transmission, fills in the gaps on subsequent transmissions. This mechanism ensures extremely high probability of delivery without requiring use of a return link.
2. Retransmission requests - a PC, if it misses parts of a package, may request retransmission of those parts. The missing parts are multi-cast so that parts need only be retransmitted once even though they were missed by multiple PCs. Retransmission requests are most appropriate for scheduled individual package transmissions where the package is scheduled less frequently.
3. Delivery confirmation - a PC, after successfully receiving and installing a package, may send a confirmation to the hub. These confirmations are tabulated and provided in the form of reports to the publisher. This method is more expensive in that it requires that a delivery confirmation (entailing a separate call) be sent by every receiving PC.

UNITED STATES PATENT AND TRADEMARK OFFICE
CERTIFICATE OF CORRECTION

PATENT NO. : 5,995,725

DATED : November 30, 1999

INVENTOR(S) : Douglas M. DILLON

It is certified that error appears in the above-identified patent and that said Letters Patent is hereby corrected as shown below:

Section 5 Data Pipe Transmission

DirecPc's data pipe services are modelled on Local Area Network multi-cast transmission. The data pipe provider passes 802.2 LLC1 Token-Ring or Ethernet multi-cast packets to the uplink. This allows off-the-shelf bridges and routers to be used to support a terrestrial backhaul. It also allows some LAN based applications to operate across the spacelink with little or no modification. The uplink relays these packets across the spacelink. The DirecPc driver passes received packets to the applications. To prevent unauthorized access, each multi-cast address is encrypted under a different key. The DirecPc device driver API allows applications to designate which multi-cast addresses are of interest. Hardware filtering in the DirecPc adapter allows the reception of any 100 different multi-cast addresses.

DirecPc network management allocates to each service provider:

1. a Committed Information Rate (CIR) – a fraction of broadcast channel bandwidth which is guaranteed to the data pipe provider, and
2. one or more multi-cast 48 bit addresses – each address operates as a separate data stream multiplexed on the one broadcast channel.

Section 6 Hybrid Internet Access

Hybrid Internet access allows a PC high-speed (over 100 Kbps) access to the Internet. An HNS provided NDIS device driver operates with an off-the-shelf TCP/IP package. Reception from the Internet takes place via DirecPc. Transmission into the Internet takes place via a dial-up SLIP connection into the uplink. Hybrid Internet Access allows operation of all the standard Internet applications including SMTP EMAIL, NNTP Usenet News, FTP, GOPHER and Mosaic. As part of initial registration, each receiving PC is provided a permanently assigned IP address.

Hybrid Internet Access is the result of joint development by HNS and the University Of Maryland funded in part by a MIPs grant. Continuing development will increase performance and allow receive-only reception of Usenet News.

Section 7 Performance Specifications

Averaged across a whole year, each DirecPc receiver should be expected to have a BER less than 10E-10 more than 99.5% of the time where a single bit error causes the loss of an entire packet.

UNITED STATES PATENT AND TRADEMARK OFFICE
CERTIFICATE OF CORRECTION

PATENT NO. : 5,995,725

DATED : November 30, 1999

INVENTOR(S) : Douglas M. DILLON

It is certified that error appears in the above-identified patent and that said Letters Patent is hereby corrected as shown below:

Section 8 User Characteristics

The receiver (antenna, cabling and PC plug-in card) is intended to be self-installable by consumers and small business. In cases where self-installation is not desirable, the DirecPc adapter will be installed by the customer and the antenna and cable will be installed by the HNS VSAT installers. The customer uses diagnostic software provided with the adapter to ensure that the PC as a whole is ready for the antenna to be installed.

Maintenance will be performed either by the user swapping components (DirecPc adapter, LNB, etc with telephone support). HNS's nationwide VSAT field-service network may also be contracted for. --

Signed and Sealed this

Twenty-sixth Day of September, 2000

Q. TODD DICKINSON

Attest:

*Attesting Officer*          *Director of Patents and Trademarks*